(12) United States Patent
Lee

(10) Patent No.: US 6,937,590 B2
(45) Date of Patent: Aug. 30, 2005

(54) METHOD OF SUPPORTING SMALL GROUP MULTICAST IN MOBILE IP

(75) Inventor: Ji-Woong Lee, Seoul (KR)

(73) Assignee: KTFreetel Co., Ltd., Seoul (KR)

( * ) Notice: Subject to any disclaimer, the term of this patent is extended or adjusted under 35 U.S.C. 154(b) by 941 days.

(21) Appl. No.: 09/894,817

(22) Filed: Jun. 28, 2001

(65) Prior Publication Data

US 2002/0080767 A1 Jun. 27, 2002

(30) Foreign Application Priority Data

Dec. 22, 2000 (KR) ........................................ 2000-80199

(51) Int. Cl.$^7$ ................................................ H04Q 7/24
(52) U.S. Cl. ..................................... 370/338; 370/401
(58) Field of Search ............................... 370/338, 401, 370/352, 353, 389, 390, 392, 393

(56) References Cited

U.S. PATENT DOCUMENTS

| | | | |
|---|---|---|---|
| 6,765,892 B1 * | 7/2004 | Leung et al. ................ | 370/332 |
| 2001/0024443 A1 * | 9/2001 | Alriksson et al. ........... | 370/401 |
| 2002/0067704 A1 * | 6/2002 | Ton ............................ | 370/329 |

OTHER PUBLICATIONS

Perkins, Charles E., "Mobile IP", IEEE Communications Magazine, May 1997, pp. 84–99.

Lee, Jiwoong, SGM support in Mobile IP, Oct. 2000, pp. 1–13.

Rick Boivie, "Small Group Multicast," Jul. 2000, pp. 1–17.

* cited by examiner

*Primary Examiner*—Chau Nguyen
*Assistant Examiner*—Blanche Wong
(74) *Attorney, Agent, or Firm*—Dann, Dorfman, Herrell and Skillman, P.C.; Henry H. Skillman (57) ABSTRACT

There is provided a method of supporting small group multicast in mobile IP in which an implicit multicast packet received by a home agent is shifted to an explicit multicast packet including the IP address of a mobile node registered as a multicast receiving party to be transmitted to a care-of address, explicit multicast routing is performed based on the current care-of address of the mobile node described in the explicit multicast packet in case where the home agent receives this explicit multicast packet, and the mobile node uses the IP address of the home agent as the originating party's address when it sends the explicit multicast packet via a multicast router of a visited network. Further, the mobile node uses a co-located care-of address as the originating party's address in case where it transmits the explicit multicast packet via the home agent, and the mobile node uses basic multicast provided by mobile IP when the loss in processes of home agents or foreign agents is judged to be more severe than the network band width loss.

5 Claims, 9 Drawing Sheets

100
METHOD OF SUPPORTING SMALL GROUP MULTICAST IN MOBILE IP

BACKGROUND OF THE INVENTION

1. Field of the Invention

The present invention relates to a method of supporting small group multicast in mobile IP. Specifically, the invention relates to a method of supporting small group multicast in mobile IP, in which an implicit multicast packet received by a home agent is shifted to an explicit multicast packet including the Internet address of a mobile node registered as a multicast receiving party to be transmitted to a care-of address, explicit multicast routing is performed based on the current care-of address of the mobile node described in the explicit multicast packet in case where the home agent receives this explicit multicast packet, and the mobile node uses the IP address of the home agent as the originating party's address when it sends the explicit multicast packet via a multicast router of a visited network. Further, the mobile node uses a co-located care-of address as the originating party's address in case where it transmits the explicit multicast packet via the home agent, and the mobile node uses basic multicast provided by mobile IP when the loss in processes of home agents or foreign agents is judged to be more severe than the network band width loss.

2. Description of the Related Art

There will be explained below a conventional mobile IP technique and small group multicast and pointed out problems with them.

1. Mobile IP

Mobile IP allows a mobile node on the Internet to be able to Internet-communicate with its Internet address without being cut-off from Internet connection even when it changes a network to which it is connected. The mobile IP was developed by working groups of Internet Engineering Task Force (IETF) established for standardization of Internet techniques, and it specifies not only protocols with respect to one-to-one communication but also multicasting protocols corresponding to one-to-many and many-to-many communications. Technical terms used in this technique and their meanings are defined below.

Mobile node: A host or router capable of changing its connection point.

Home network: A network to which the mobile node originally belonged. The mobile node operates as a fixed node when it is plugged into the home network.

Foreign network: Networks other than the home network.

Visited network: A foreign network to which the mobile node is being currently connected.

Home agent: A router that recognizes the current connection point of the mobile node on its home network to tunnel packets coming into the mobile node.

Foreign agent: A router providing routing service on a network the mobile node visits. If the mobile node uses the foreign agent, the foreign agent receives packets the home agent tunneled and returns them to the mobile node.

Care-of address: The end point of a tunnel toward the mobile node when the mobile node resides on the foreign network. It is referred to as foreign agent care-of address when the foreign agent is used as a care-of address and co-located care-of address when the address of a local network is used as a care-of address.

Communication includes two modes of transmission and reception. A mobile node's multicast reception is described first below.

Multicast reception in mobile IP can be performed through two methods. The first method is direct reception via a multicast router of a visited network and the second one is receipt from a home agent serving as a multicast router through bi-directional tunneling between a care-of address and the home agent. Though the first method has satisfactory efficiency in terms of optimization of routing path, there is a possibility of cutting off communication due to a security policy such as ingress filtering in case of using a foreign agent care-of address. Further, when a co-located care-of address is used, it does not generate a security problem but brings about severe shortage of Internet version 4 (Ipv4) address. Accordingly, the multicast reception through the bi-directional tunneling will be used for a while when mobile IP becomes commercially available.

Figure 1:
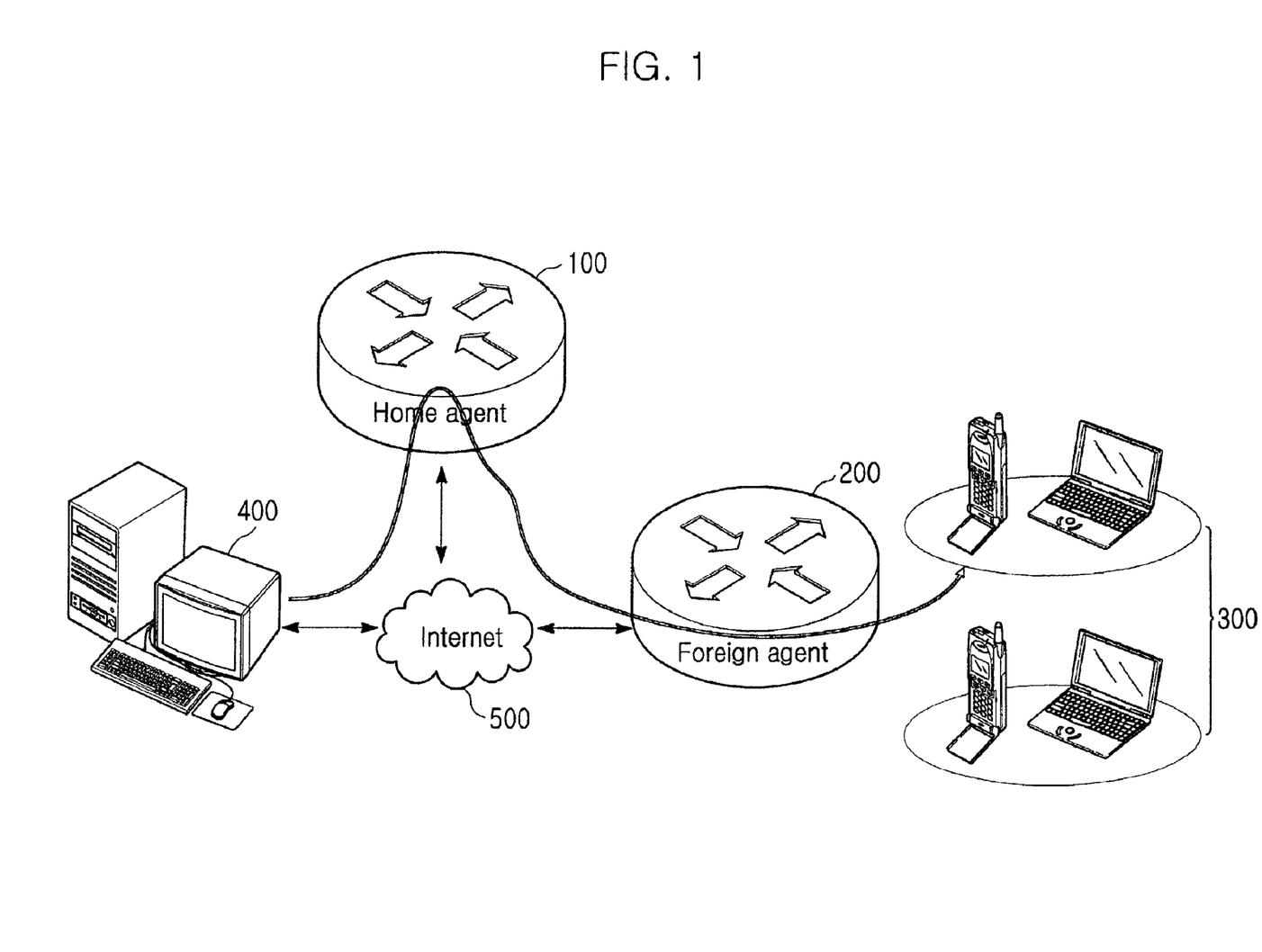
FIG. 1 illustrates a procedure of receiving unicast packets in mobile IP.

FIG. 1 illustrates a procedure of receiving a unicast packet in mobile IP. As shown in FIG. 1, bi-directional tunneling is performed in such a manner that a home agent 100 receives a multicast packet to be transmitted to a mobile node 300 from a specific communication counterpart 400, encapsulates the received packet in order to forward the packet to a destination, i.e., the mobile node 300, and transmits the encapsulated packet to a care-of address that is the end point of the tunnel through mobile IP tunneling. A node (foreign agent 200 in FIG. 1) having the care-of address strips the encapsulation for the mobile IP tunnel, confirms that the destination address corresponds to the mobile node 300, and then forwards the packet to the mobile node 300. The mobile mode 300 accepts the packet in unicast, removes the encapsulation and then receives it as a multicast packet. Here, the care-of address may be a foreign agent care-of address or co-located care-of address. As described above, the bi-directional tunneling is referred to as nested tunneling because encapsulation occurs twice.

Figure 2:
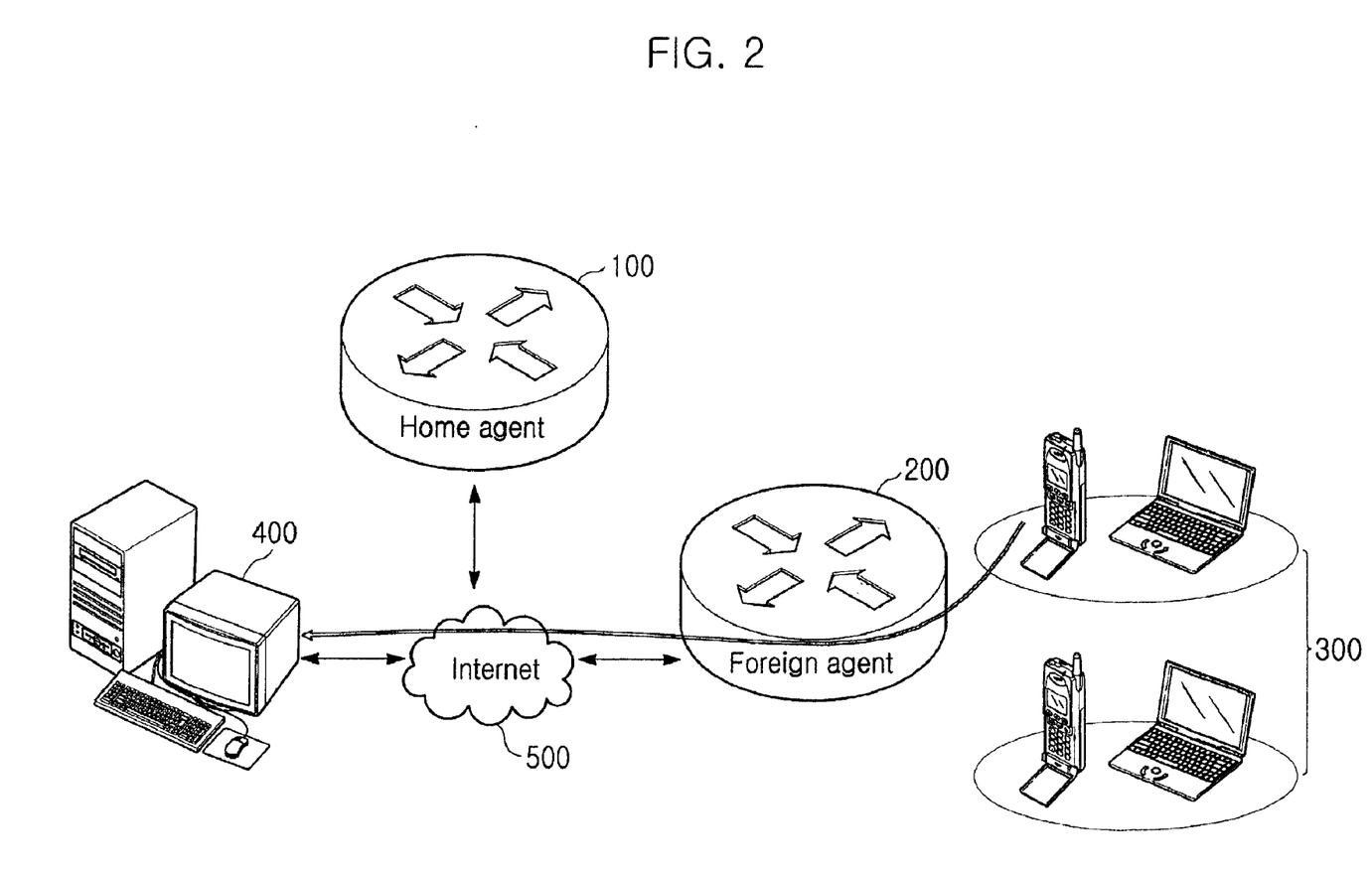
FIG. 2 illustrates a case that a mobile node in mobile IP transmits multicast packets through a visited network's multicast router.
Figure 3:
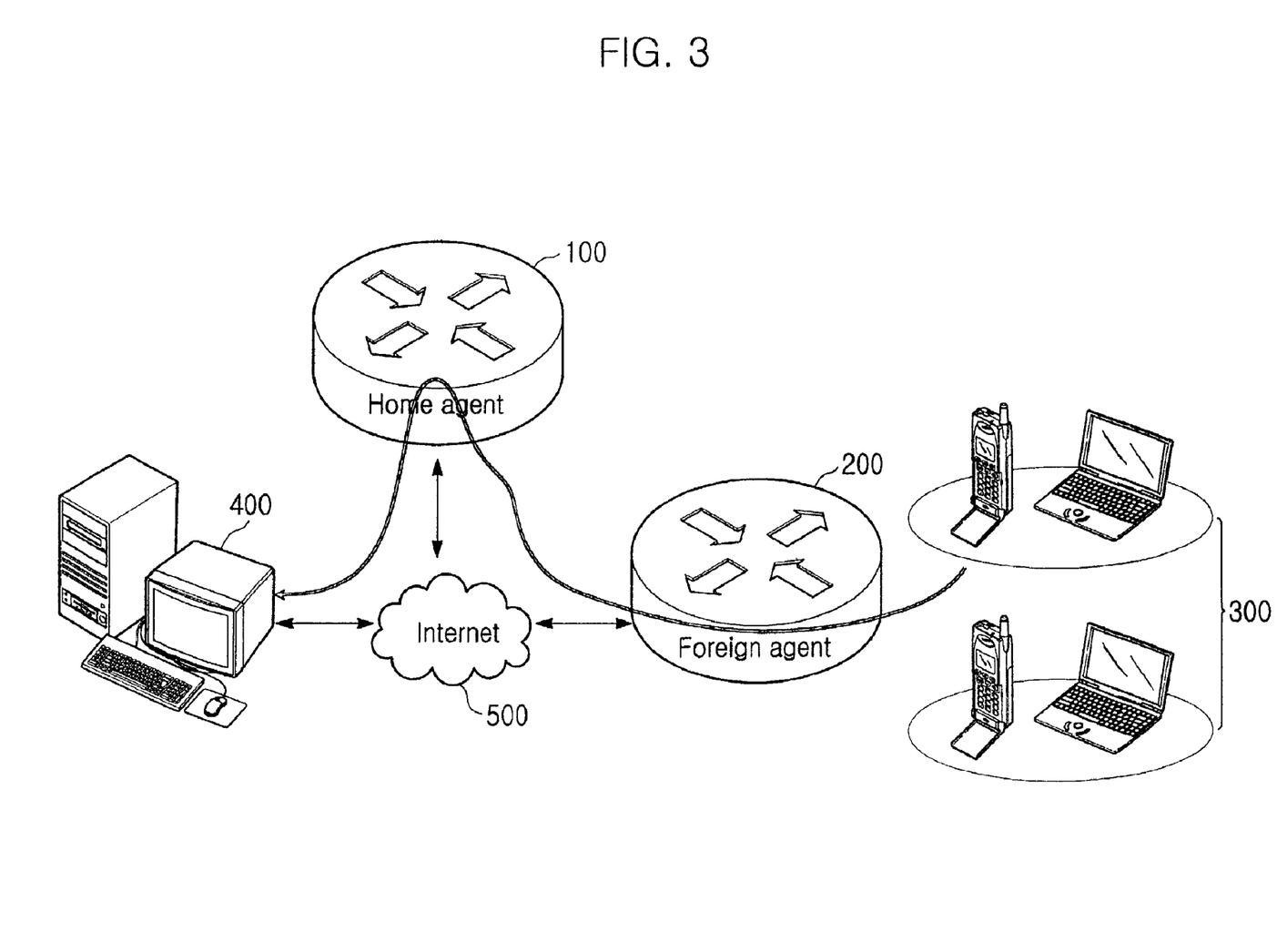
FIG. 3 illustrates a case that a mobile node in mobile IP transmits multicast packets through a home agent.

FIG. 2 illustrates a case where the mobile node in mobile IP transmits a multicast packet through a multicast router of a visited network, and FIG. 3 illustrates a case where the mobile node in mobile IP transmits a multicast packet through a multicast router of a home agent.

There are two methods by which the mobile node performs multicast transmission on a foreign network. The first method is to send the multicast packet to a specific communication counterpart 400 via the multicast router (i.e. foreign agent 200 to which the mobile node is being currently connected) of the visited network, as shown in FIG. 2. The second one is to deliver the multicast packet to the counterpart 400 via the home agent 100 serving as a multicast router through bi-directional tunneling between the home agent 100 and a care-of address.

With the first method, the mobile node 300 must use a co-located care-of address as its originating party's address when it transmits the multicast packet via the multicast router 200 of the visited network on the visited network because multicast routing, differently from unicast routing, generally depends on the originating address. Accordingly, this method is not recommendable because of shortage of Internet version 4 addresses, as described above.

In the second method, the mobile node 300 generates the multicast packet using its home IP address as its originating address and transmits it to the home agent 100 through bi-directional tunneling between the home agent 100 and the care-of address, and the home agent 100 then routes the packet. Even with the second method, the mobile node 300 has to use nothing but the home IP address as the originating address of the multicast packet even if the mobile node, 300 uses the co-located care-of address because of reason similar to that of the first method.

2. Small Group Multicast

Conventional Internet multicast used addresses of Class D addresses (244.00.0239.255.255.255) that is an address range specially assigned for only Internet multicast as destination addresses. So, receiving terminals which wished to be provided with specific multicast services requested multicast routers to which multicast addresses are attached as destination addresses to them, and they was able to receive the multicast packets if the multicast routers delivered them thereto. This kind of multicast is referred to as implicit multicast. The implicit multicast has been used as a multicast technique because it has advantages that scalability can be easily maintained even if the number of receiving parties or the number of multicast routers is considerably increased and routers manage only a relatively small amount of statuses. However, there are many cases where only very small number of subscribers exists in actual situations of multicast applications. Accordingly, an explicit multicast technique has been proposed.

With the explicit multicast, every multicast packet is transmitted, including unicast addresses of all receiving parties, and intermediate routers confirm the unicast addresses of all receiving parties, duplicate and transmit the multicast packet along an appropriate path. Accordingly, the routers need not to manage members of a group and the existing unicast routing technique can be used without any change so that loads on the management of multicast statuses of the routers can be lessened. The most promising one of the explicit multicast techniques is small group multicast.

3. Problems

Multicast reception carried out by a mobile node in mobile IP generates the following problems because it uses nested tunneling.

The first problem relates to multiple nested tunnelings for multiple mobile nodes. If a plurality of mobile nodes belonging to the same home network perform multicast reception through bi-directional tunneling for the same multicast group on the same visited network, the home agent carries out encapsulation having each mobile node registered for one multicast packet the home agent received as a destination address and gathers multiple unicast packets constructed in this manner to send the gathered packets to the care-of addresses of the mobile nodes using mobile IP tunneling. Here, it can be known that, although there is one original packet, packets as many as the mobile nodes are transmitted in order that the original packet may go to the foreign network from the home agent. That is, though a payload is multicast, the path between the home agent and the foreign network cannot realize unification of overlapping traffic, an advantage of multicast, and the network efficiency is decreased because of nested tunneling rather than the unicast reception.

Secondly, there is a limit to the originating address generated in multicast transmission. Since multicast routing depends on the originating party's address, the co-located care-of address must be used as the originating address when the multicast transmission is carried out via the multicast router of the visited network and only the home IP address must be used as the originating address in case of transmission through the home agent.

The third problem is incompatibility with explicit multicast. Existing mobile IP does not consider the explicit multicast technique so that it could not service the explicit multicast even when explicit multicast packets arrived at a home network. To solve this problem, a node performing explicit multicast shifts all of explicit multicast packets to unicast packets to transmit them to the home network. As a result, mobile Internetwork becomes an ineffective network incapable of employing any of advantages of explicit multicast and implicit multicast.

SUMMARY OF THE INVENTION

It is, therefore, an object of the present invention to provide a method of supporting small group multicast in mobile IP, capable of solving and improving problems with multicast techniques in conventional mobile IP.

To accomplish the object of the present invention, the invention provides a method of supporting small group multicast in mobile IP which combines a mobile IP technique with an explicit multicast technique.

First of all, symbols used in the method of the invention are defined to help general understanding of the present invention.

"[ ]": A single complete IP packet

"S:": A space for an originating party's address

"D:": A space for a destination address

"A:": A space for a small group multicast originating party's address

"L:": A space for a small group multicast destination address

"CN": The address of a specific communication counterpart

"MN": The home IP address of a mobile node

"HA": A home agent's address

:FA": A foreign agent's address

"CL": A Care-of address

"SGM:": A small group multicast destination address

"Grp": An implicit multicast address

"SN": The address of a fixed node

"LM": The address of a multicast router of a visited network

DETAILED DESCRIPTION OF THE PREFERRED EMBODIMENT

Reference will now be made in detail to the preferred embodiments of the present invention, examples of which are illustrated in the accompanying drawings. It should be noted in the drawings that like components are indicated by like reference numerals.

Figure 4:
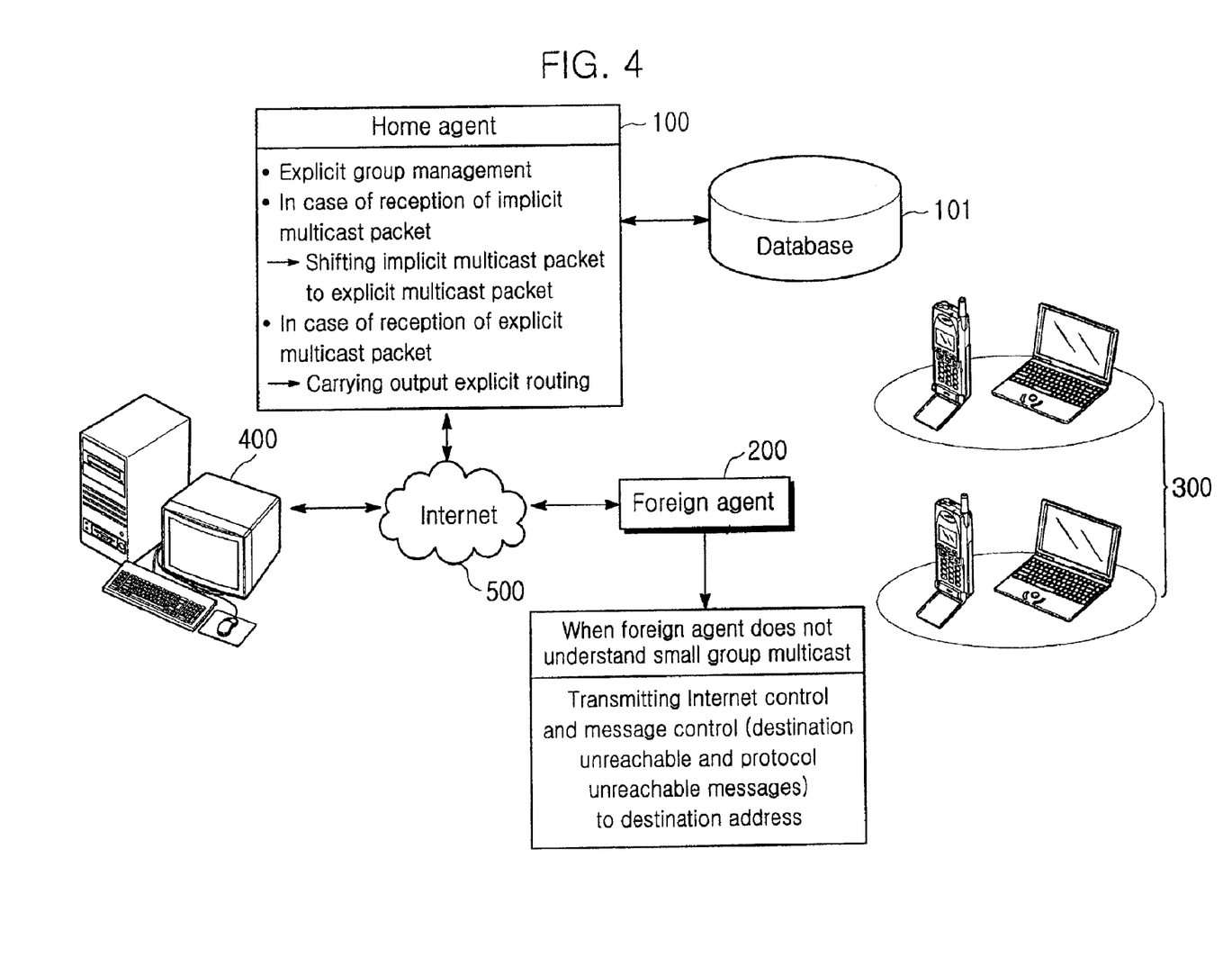
FIG. 4 illustrates a system environment for realizing a method of supporting small group multicast according to a preferred embodiment of the present invention.

FIG. 4 illustrates a system environment for realizing the method of supporting small group multicast according to a preferred embodiment of the invention.

Referring to FIG. 4, a home agent 100 is a router that recognizes the current connection point of each of mobile nodes 300 belonging to a home network to tunnel a multicast packet to be transmitted to the mobile nodes 300. The home agent 100 includes a foreign agent 200 that performs explicit group management and has a multicast group to which the foreign agent belongs and mobile nodes 300 receiving that group, and a database 101 in which relationships among the mobile nodes 300 registered with the foreign agent 200 are defined in a tree form. Further, The home agent 100 shifts a received implicit multicast packet to an explicit multicast packet including the IP addresses of the mobile nodes 300 registered as multicast receiving parties to transmit the packet to a care-of address. When the home agent 100 receives an explicit multicast packet, it carries out explicit multicast routing of the mobile nodes 300 described in this packet.

In case where a mobile node 300 transmits the explicit multicast packet via a multicast router of a visited network, it uses the IP address of the home network as the originating party's address. This is possible because small group multicast routing uses unicast routing algorithm without any change so that it does not depend on the originating party's address described as above. When the mobile node 300 sends the explicit multicast packet through the home agent 100, it uses a co-located care-of address as the originating party's address. This can be performed because of the same reason as the aforementioned one.

When it is judged that the loss in process of the home agent 100 or foreign agent 200 is more severe than the band width loss of network, basic multicast provided by mobile IP is used rather than supporting the small group multicast technique in mobile IP.

Meantime, a foreign agent that does not understand small group multicast among foreign agents should be able to transmit Internet control message protocol, destination unreachable and protocol unreachable messages to the originating party's address.

There will be explained below transmission of multicast packets depending on transmission paths on the network having the aforementioned system characteristics in accordance with the present invention.

Figure 5:
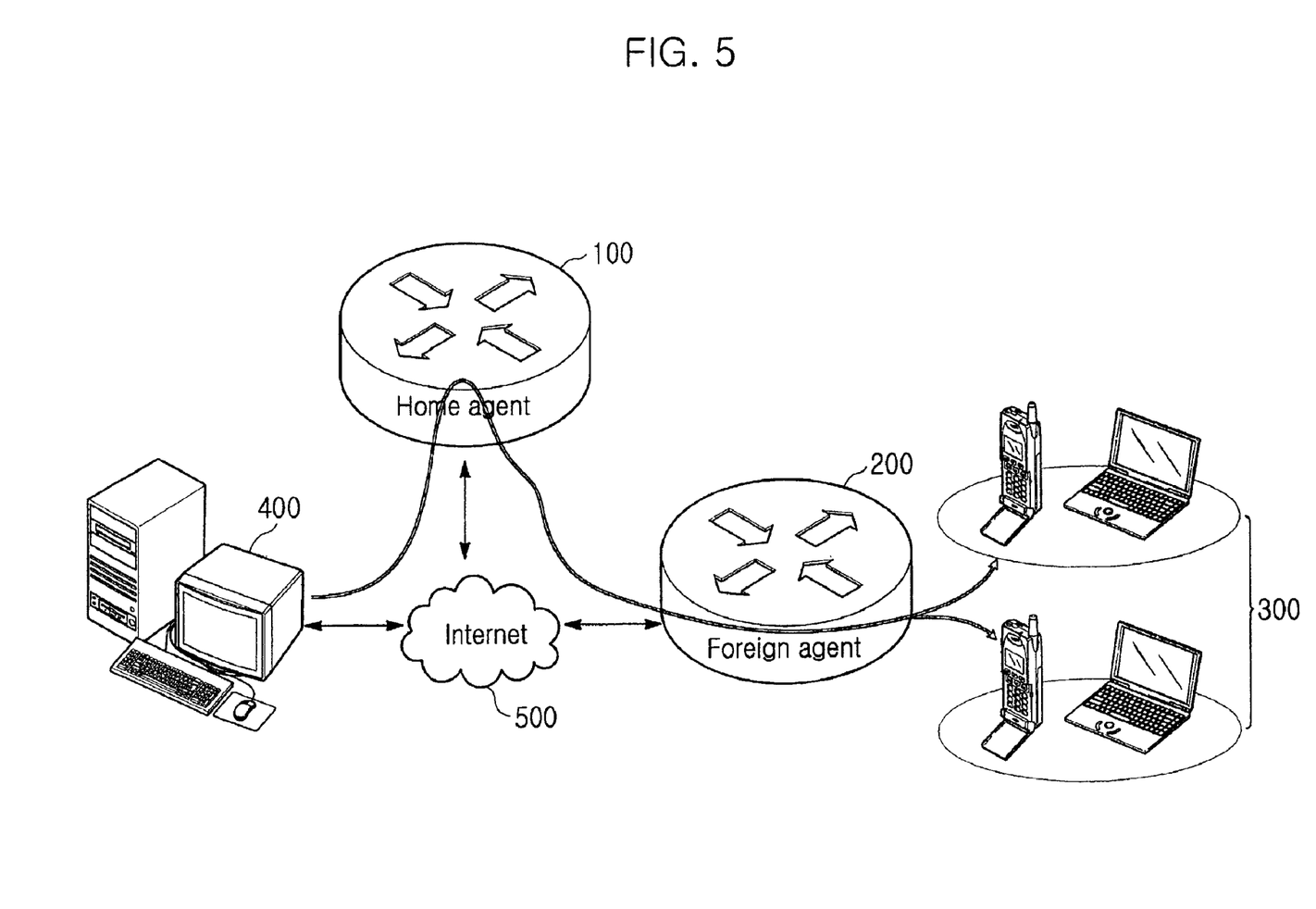
FIG. 5 illustrates small group multicast from a specific communication counterpart toward a mobile node using a foreign agent care-of address and bi-directional tunneling according to a preferred embodiment of the present invention.

Firstly, in case of transmission of a small group multicast packet from a specific communication counterpart 400 to a mobile node 300 using a foreign agent care-of address and bi-directional tunneling (i.e. in case where data is delivered from a specific communication counterpart to a mobile node in a foreign agent), the multicast packet sent from the communication counterpart 400 is delivered to a home agent 100 to be transmitted to the mobile node 300 corresponding to its destination via a foreign agent 200, as shown in FIG. 5. This is represented in symbols as follows.

CN→HA→FA→MN

The IP packet when it originates at CN is [S:CN A:CN L:SGM]. That is, the space for the originating address and the space for the small group multicast originating address of the IP packet are filled with the address of the communication counterpart 400 that is the originating party and the space for the small group multicast destination address is filled with the destination address of small group multicast.

The home agent 100 that received the IP packet transmitted from CN originates a packet such as [S:HA D:FA[S:HA D:FA A:CN L:SGM]]. In other words, the home agent's address is loaded in the space for the originating address and the foreign agent's address is loaded in the space for the destination address. Further, the originating address space, destination address space, small group multicast originating address space and small group multicast destination address space are filled with the home agent's address, foreign agent's address, the communication counterpart's address and the destination address of small group multicast, respectively, in order to perform explicit multicast.

Subsequently, the foreign agent 200 originates an IP packet in which the communication counterpart's address is being loaded in the originating address space and the home network IP address of the mobile node 300 is being loaded in the destination address space, i.e., [S:CN D:MN] with reference to the IP packet received from the home agent 100. The mobile node 300 corresponding to the destination receives this IP packet.

Figure 6:
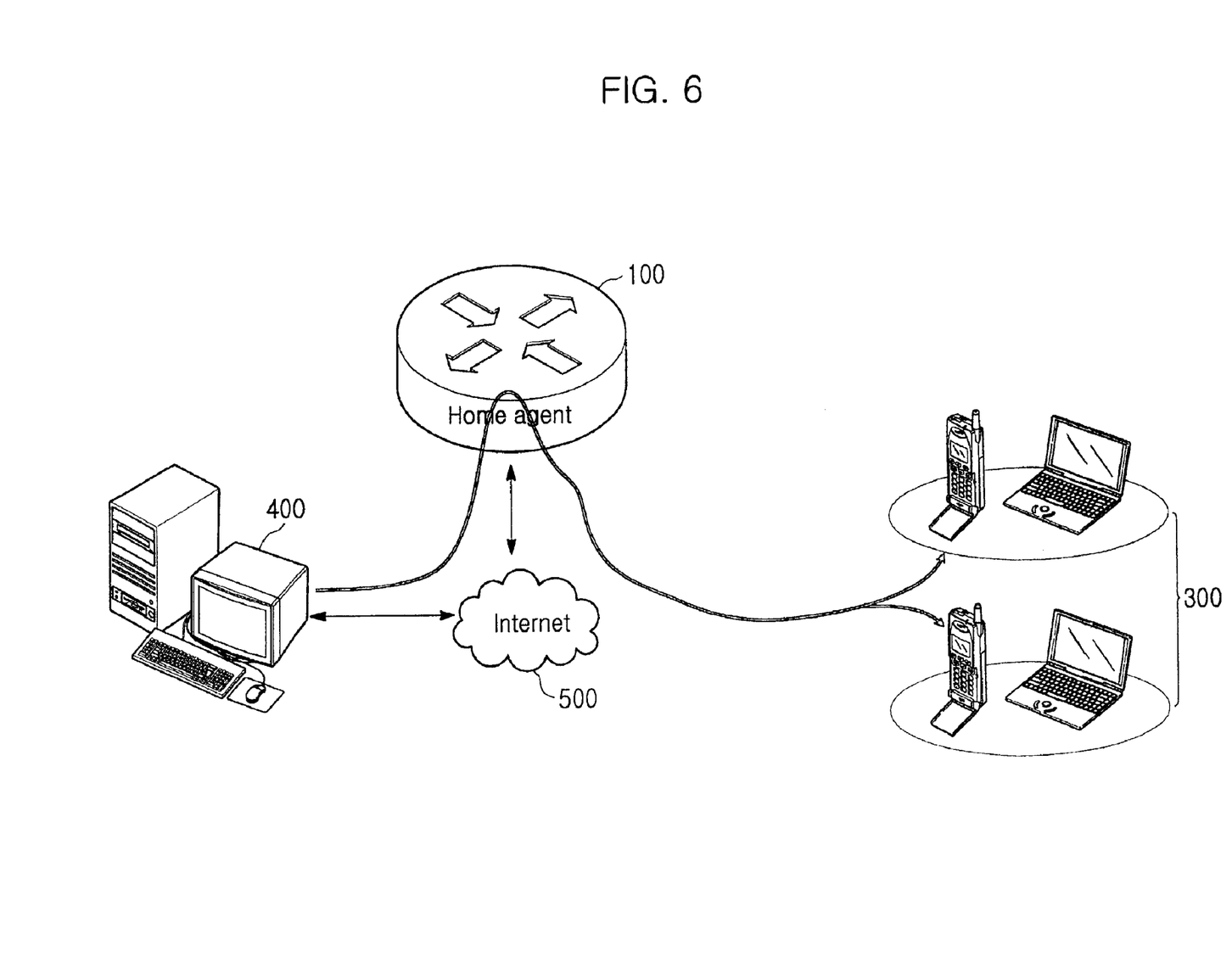
FIG. 6 illustrates small group multicast from a specific communication counterpart toward a mobile node using a co-located care-of address and bi-directional tunneling according to a preferred embodiment of the present invention.

Secondly, in case where a small group multicast packet is transmitted from a specific communication counterpart 400 to a mobile node 300 using a co-located care-of address and bi-directional tunneling (i.e. data is delivered from a specific communication counterpart belonging to a foreign network to a mobile node that obtains an individual address to use it as a care-of address), the transmission path originates at the communication counterpart and reaches the mobile node 300 via a home agent 100, as shown in FIG. 6. This is represented in symbols as follows.

CN→HA→MN

CN originates an IP packet such as [S:CN A:CN L:SGM], that is, an IP packet in which the communication counterpart's address is being loaded in the originating address space and the small group multicast originating address space, and the small group multicast destination address is being loaded in the small group multicast destination address space.

The home agent 100 receives the IP packet transmitted from CN to originate a packet such as [S:HA D:CL[S:CN D:MN]]. Specifically, it originates the IP packet with the originating address space being filled with the home agent's address, the destination address space being filled with the care-of address. Further, in order to perform explicit multicast, the IP packet also has the origination address space being filled with the communication counterpart's address and the destination address space being filled with the mobile node's home network IP address. The mobile node 300 receives the data transmitted from the communication counterpart 400 through the IP packet originated at the home agent 100.

Figure 7:
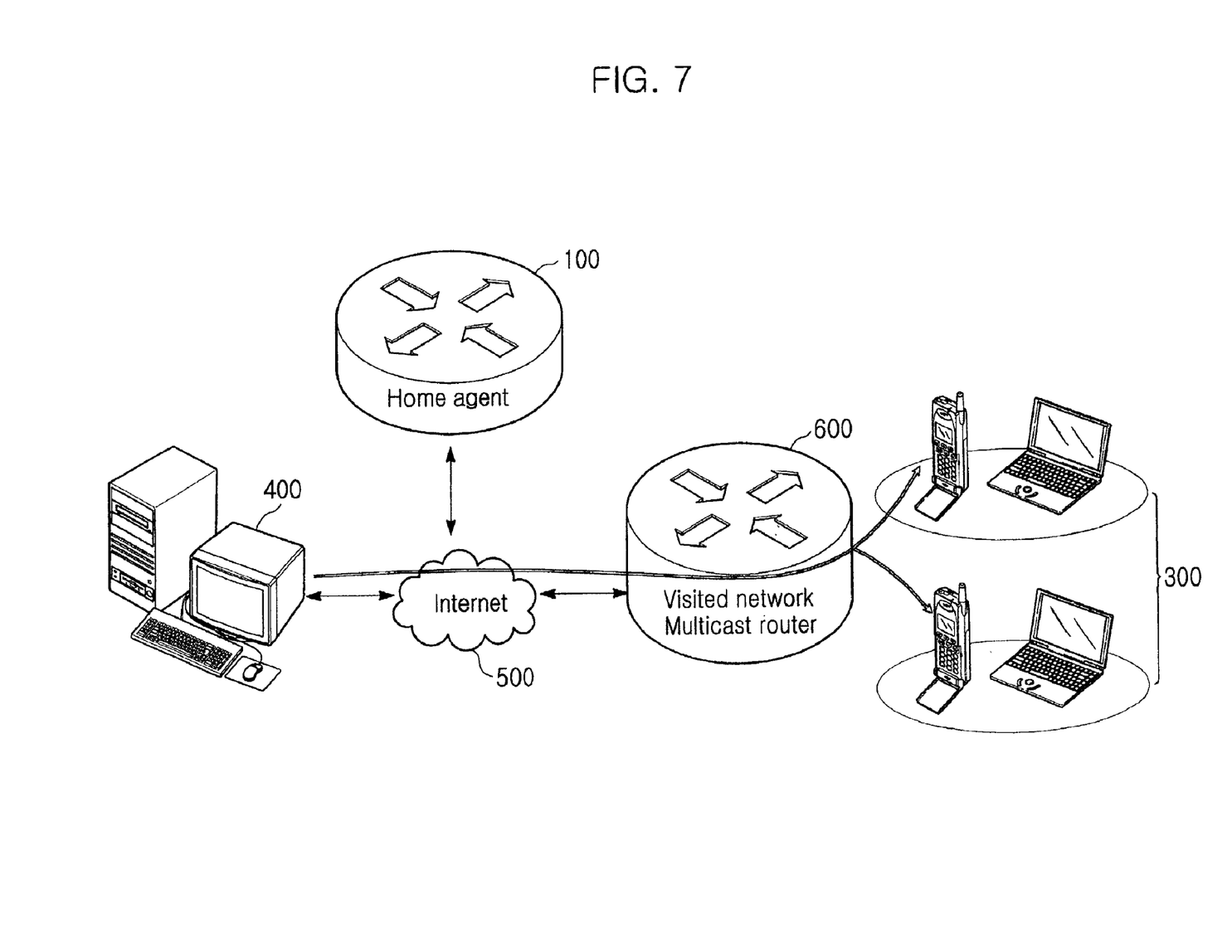
FIG. 7 illustrates small group multicast from a specific communication counterpart toward a mobile node using a co-located care-of address and a visited network multicast router according to a preferred embodiment of the present invention.

Thirdly, in case where a small group multicast packet is transmitted from a specific communication counterpart to a mobile node 300 using a co-located care-of address and a multicast router of a visited network, its transmission path is formed from the communication counterpart to the mobile node 300 via a visited network multicast router 600, as shown in FIG. 7, which is represented in symbols as follows.

CN→LM→MN

CN originates an IP packet of [S:CN A:CN L:SGM], that is, an IP packet having the originating address space and the small group multicast originating address space being loaded with the communication counterpart's address and the small group multicast destination address space being filled loaded with the small group multicast destination address. Subsequently, the visited network multicast router 600 originates an IP packet such as [S:CN D:CL] meaning that the originating party's address space is being filled with the communication counterpart's address and the destination address space is being filled with the care-of address, and the corresponding mobile node 300 receives this packet.

Figure 8:
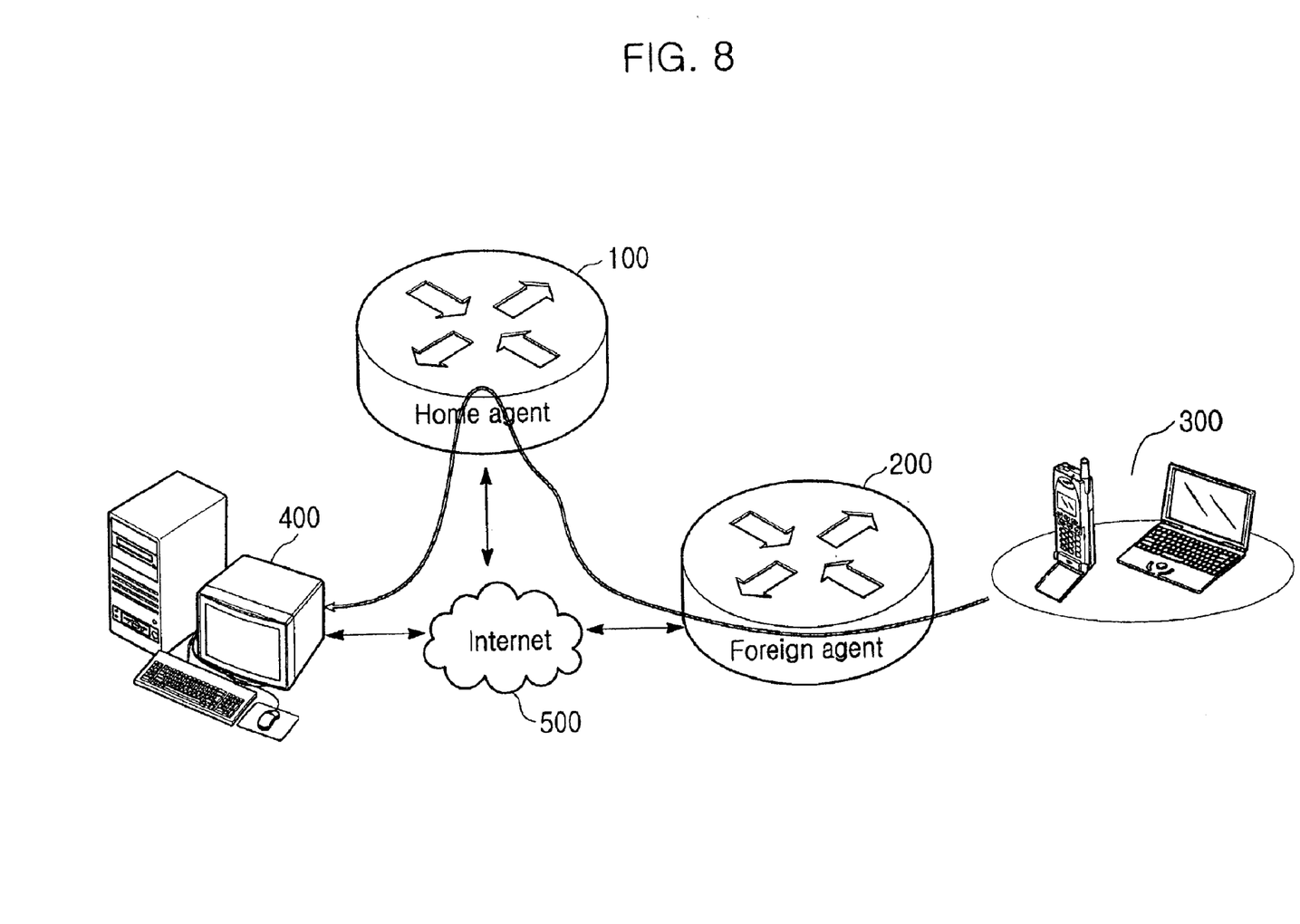
FIG. 8 illustrates small group multicast from a mobile node using a foreign agent care-of address and bi-directional tunneling toward a specific communication counterpart according to a preferred embodiment of the present invention.

Fourthly, in case where a small group multicast packet is transmitted from a mobile node 300 using a foreign agent care-of address and bi-directional tunneling to a specific communication counter part 400, its transmission path is formed such as MN→FA→HA→CN, as shown in FIG. 8. In other words, data is transmitted from the mobile node (originating party) 300 via a foreign agent 200, a home agent 100 to the communication counterpart (receiving party) 400 in this case.

The mobile node 300 originates a packet of [S:MN D:SGM] meaning that the origination address space is being filled with the mobile node's home network IP address and the destination address space is being filled with the small group multicast destination address. This packet originates as an IP packet such as [S:FA D:HA[S:MN D:SGM]] through the foreign agent 200. In this packet, the address of the foreign agent 200 is loaded in the originating address space and the home agent's address is loaded in the destination address space. In addition, the address of the communication counterpart 400 is loaded in the originating address space and the destination address of small group multicast is loaded in the destination address space for explicit multicast.

Subsequently, the home agent 100 sends a packet of [S:MN D:SGM] (a packet having the originating address space being loaded with the home IP address of the mobile node 300 and the destination address space being loaded with the small group multicast destination address) and the communication counterpart 400 receives an IP packet constructed of [S:MN D:CN].

Figure 9:
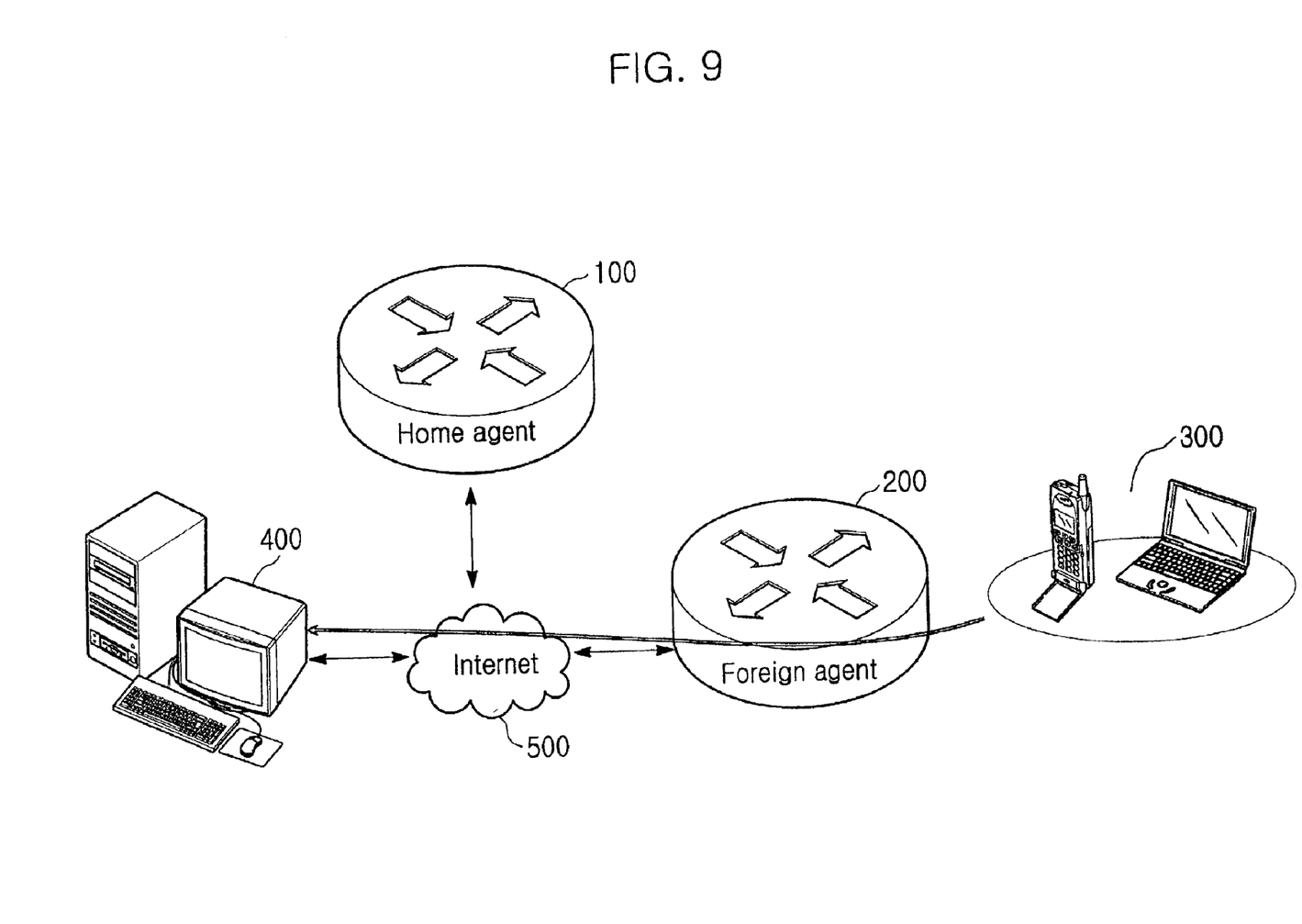
FIG. 9 illustrates small group multicast from a mobile node using a foreign agent care-of address and a visited network multicast router toward a specific communication counterpart according to a preferred embodiment of the present invention.

Fifthly, in case where a small group multicast packet is transmitted from a mobile node 300 using a foreign agent care-of address and a foreign agent 200 to a specific communication counter part 400, its transmission path is formed from the mobile node 300 to the communication counterpart 400 via the foreign agent 200, as shown in FIG. 9. This is represented in symbols as follows.

MN→FA→CN

The mobile node 300 originates an IP packet of [S:MN D:SGM] in which the origination address space is loaded with the home IP address of the mobile node 300 and the destination address space is loaded with the destination address of small group multicast. The foreign agent 200 originates the same packet [S:MN G:SGM], and CN receives a packet of [S:MN D:CN].

Sixthly, in case where a small group multicast packet is transmitted from a mobile node 300 using a co-located care-of address and a visited network multicast router to a specific communication counterpart 400, its transmission path is directly formed from the mobile terminal to the communication counterpart 400 such as MN→CN.

MN originates a packet ([S:CL D:SGM]) constructed of the originating address space loaded with the care-of address and the destination address space loaded with the small group multicast destination address. The communication counterpart 400 receives an IP packet such as [S:CL D:CN].

As described above, though the present invention substantially deals with the technique of combining the small group multicast with the mobile IP network, other explicit multicast techniques can be combined with the mobile IP network.

According to the present invention, multicast substantially affecting the path is realized even to the home agent and foreign agent care-of address so that network utilizing efficiency of the mobile IP network can be increased in proportional to the number of registered mobile nodes. This can be easily and effectively applied to IMT-2000 network having a small number of foreign agents. Further, the present invention eliminates the limit to the origination address when the mobile node operates as a multicast transmitting party on the mobile IP network to improve the operation range of the mobile node. Consequently, the present invention provides not only short-term economic effect on the mobile Internet network but also developmental base for long-term Internet-based techniques.

Although specific embodiments including the preferred embodiment have been illustrated and described, it will be obvious to those skilled in the art that various modifications may be made without departing from the spirit and scope of the present invention, which is intended to be limited solely by the appended claims.

What is claimed is:

1. A method for supporting small group multicast in mobile IP in a mobile IP environment including a plurality of mobile nodes, a home network to which the mobile nodes belong, a home agent that is a router recognizing the current connection point of a mobile nodes on the home network to tunnel packets coming into the mobile node, a foreign network meaning a communication network other than the home network, a visited network meaning a foreign network to which the mobile node is currently being connected, a foreign agent corresponding to a router providing routing service on the visited network, and a care-of address meaning the end point of a tunnel toward the mobile node when the mobile node resides on the foreign network, wherein, in case where the home agent receives an implicit multicast packet to be transmitted to the mobile node belonging to the foreign agent, the home agent shifts the received multicast packet to an explicit multicast packet including the IP address of the mobile node registered as a receiving part of the multicast packet to transmit it to the care-of address, and in case where the home agent receives an explicit multicast packet to be transmitted to the mobile node belonging to the foreign agent, the home agent sends the multicast packet according to the care-of address shown in the received multicast packet.

2. The method for supporting small group multicast in mobile IP as claimed in claim 1, wherein, when the mobile node transmits the explicit multicast packet via a multicast router of the visited network, it uses the IP address of the home network as the multicast packet originating party's address.

3. The method for supporting small group multicast in mobile IP as claimed in claim 1, wherein, when the mobile node transmits the explicit multicast packet via the home agent, it uses a co-located care-of address as the multicast packet originating party's address.

4. The method for supporting small group multicast in mobile IP as claimed in claim 1, wherein, in case where a foreign agent who does not understand explicit multicast receives the multicast packet, the foreign agent transmits one of Internet control message protocol, destination protocol unreachable and protocol unreachable messages to the originating party's address of the received multicast packet.

5. The method for supporting small group multicast in mobile IP as claimed in claim 1, wherein the home agent includes a multicast group belonging to the home agent, foreign agents to which the mobile nodes receiving the multicast group are belong, and a database in which relationships among the mobile nodes registered with the foreign agents are defined in a tree form.

* * * * *